US012190783B2

(12) United States Patent

Zhou et al.

(10) Patent No.: US 12,190,783 B2
(45) Date of Patent: Jan. 7, 2025

(54) CURRENT CONTROL CIRCUIT, DISPLAY PANEL DRIVING DEVICE AND DISPLAY DEVICE

(71) Applicant: HKC CORPORATION LIMITED, Guangdong (CN)

(72) Inventors: Renjie Zhou, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/926,735

(22) PCT Filed: Dec. 30, 2021

(86) PCT No.: PCT/CN2021/143356
§ 371 (c)(1),
(2) Date: Nov. 21, 2022

(87) PCT Pub. No.: WO2023/060779
PCT Pub. Date: Apr. 20, 2023

(65) Prior Publication Data
US 2024/0242658 A1 Jul. 18, 2024

(30) Foreign Application Priority Data
Oct. 14, 2021 (CN) .......................... 202111197153.6

(51) Int. Cl.
*G09G 1/00* (2006.01)
*G09G 3/20* (2006.01)

(52) U.S. Cl.
CPC ... *G09G 3/2096* (2013.01); *G09G 2310/0291* (2013.01); *G09G 2330/04* (2013.01)

(58) Field of Classification Search
CPC ......... G09G 3/2096; G09G 2310/0291; G09G 2330/04
See application file for complete search history.

(56) References Cited

U.S. PATENT DOCUMENTS

2008/0042583 A1* 2/2008 Kobayashi ........... G09G 3/3208 315/169.3
2013/0088803 A1 4/2013 Hyun et al.
(Continued)

FOREIGN PATENT DOCUMENTS

CN 103458578 A 12/2013
CN 104464673 A 3/2015
(Continued)

OTHER PUBLICATIONS

Office Action issued on Dec. 4, 2023, in corresponding Japanese Application No. 2022-573631, 8 pages.
(Continued)

*Primary Examiner* — Sanghyuk Park
(74) *Attorney, Agent, or Firm* — Maier & Maier, PLLC

(57) ABSTRACT

A current control circuit, which includes an energy storage unit, a first switch unit, and a pulse width modulation unit. A first end of the energy storage unit is connected to a first preset voltage terminal V1 through the first switch unit, the first end of the energy storage unit is further connected to a first signal output of the level conversion chip so as to input a high level signal. A second end of the energy storage unit is connected to other signal outputs of the level conversion chip. The pulse width modulation unit is configured to modulate a duty cycle of the first switch unit. The current control circuit can accurately control the magnitude of the current in the display panel after a power-off instruction is received by the display device, thereby protecting the display panel.

20 Claims, 3 Drawing Sheets

(56) References Cited

U.S. PATENT DOCUMENTS

| | | | | |
|---|---|---|---|---|
| 2016/0049872 | A1* | 2/2016 | Park | H02M 1/088 345/212 |
| 2016/0260382 | A1* | 9/2016 | Choi | G09G 3/3258 |
| 2017/0004800 | A1* | 1/2017 | Park | G09G 3/3648 |
| 2021/0174742 | A1* | 6/2021 | Hwang | G09G 3/3233 |

FOREIGN PATENT DOCUMENTS

| | | | |
|---|---|---|---|
| CN | 106356033 | A | 1/2017 |
| CN | 109147710 | A | 1/2019 |
| CN | 109215601 | A | 1/2019 |
| CN | 109712590 | A | 5/2019 |
| CN | 110264933 | A | 9/2019 |
| CN | 111179873 | A | 5/2020 |
| CN | 111445883 | A | 7/2020 |
| CN | 113129848 | A | 7/2021 |
| CN | 214175660 | U | 9/2021 |
| CN | 113643644 | A | 11/2021 |
| JP | 2004138958 | A | 5/2004 |
| KR | 20090026577 | A | 3/2009 |
| KR | 20130037486 | A | 4/2013 |

OTHER PUBLICATIONS

International Search Report issued on Jun. 29, 2022, in corresponding International Application No. PCT/CN2021/143356; 5 pages.

* cited by examiner

CURRENT CONTROL CIRCUIT, DISPLAY PANEL DRIVING DEVICE AND DISPLAY DEVICE

CROSS-REFERENCE TO RELATED APPLICATIONS

This application is the U.S. national phase of International Application No. PCT/CN2011/143356 with an international filing date of Dec. 30, 2021, designating the U.S., now pending, and further claims priority benefits to Chinese Patent Application No. 202111197153.6 filed Oct. 14, 2021, the entire contents of which are incorporated herein by reference.

FIELD

The present application relates to the field of displaying technology, and more particularly to a current control circuit, a display panel driving device, and a display device.

BACKGROUND

The display device generally includes a timing control chip, a level conversion chip, and a display panel. The timing control chip is configured to output a timing control signal to the level conversion chip, the level conversion chip is configured to generate a plurality of gate driver on array (GOA) signals according to the timing control signal, the GOA signal may be such as a gate switching-on signal, a gate switching-off signal, a scanning signal, a reset signal, and the like. The level conversion chip has a plurality of signal outputs, and the plurality of signal outputs are configured to output a plurality of GOA signals respectively. The display panel has a plurality of signal inputs used for receiving the plurality of GOA signals respectively. The plurality of GOA signals are used to drive the display panel, so that the display panel is enabled to display an image.

In the related art, the display device further includes a discharge circuit. When the display device receives a power-off instruction, the discharge circuit is operated, the plurality of signal outputs of the level conversion chip are short-circuited through the discharge circuit. In this condition, the signal output of the level conversion chip for outputting the gate switching-off signal outputs a high level signal, and other signal outputs of the level conversion chip does not output a level signal. In this condition, high level signals are input to a plurality of signal inputs of the display panel, all transistors in the display panel are in switching-on state, so that charges in the display panel are fully released.

However, due to the fact that the discharge circuit makes the plurality of signal outputs of the level conversion chip to be short-circuited, and high level signals are received at the plurality of signal inputs of the display panel, which may cause an excessive current in the display panel instantaneously, and thereby causing a damage to the display panel.

SUMMARY

One objective of the embodiments of the present application is to provide a current control circuit, a display panel driving device and a display device, which can accurately control the magnitude of the current in the display panel after the display panel receives a power-off instruction, thereby protecting the display panel from damage.

In one aspect, a current control circuit applied to a display panel driving device is provided, the current control circuit includes a level conversion chip, the level conversion chip has a plurality of signal outputs, a plurality of signal outputs of the level conversion chip are configured to be connected to a plurality of signal inputs of the display panel in a one-to-one correspondence manner. A high level signal is output through a first signal output in a plurality of signal outputs of the level conversion chip when the level conversion chip receives a power-off instruction.

The current control circuit includes an energy storage unit, a first switch unit, and a pulse width modulation unit.

A first end of the energy storage unit is configured to be connected to the first signal output of the level conversion chip to receive the high level signal, a second end of the energy storage unit is configured to be connected to at least one second signal output of the level conversion chip, and the second signal output is other signal output(s) other than the first signal output in a plurality of signal outputs of the level conversion chip.

A first end of the first switch unit is configured to be connected to a first preset voltage terminal, a second end of the first switch unit is connected to a first end of the energy storage unit, and a control end of the first switch unit is connected to an output of the pulse width modulation unit.

An output of the pulse width modulation unit is configured to output a pulse width modulation signal used for controlling a duty cycle of the first switch unit, and thereby controlling a magnitude of a voltage at a first end of the energy storage unit and a magnitude of a current in the energy storage unit.

Optionally, the current control circuit further includes a second switch unit and a comparator.

A first end of the second switch unit is configured to be connected to the first signal output of the level conversion chip, and a second end of the second switch unit is connected to a first end of the energy storage unit.

A first input of the comparator is configured to be connected to a first signal output of the level conversion chip: a second input of the comparator is configured to be connected to a second preset voltage terminal. A voltage at the second preset voltage terminal is lower than a voltage of the high level signal. An output of the comparator is connected to a control end of the second switch unit, so that the comparator controls the second switch unit to be switched-on when the high level signal is received at the first input of the comparator.

Optionally, the comparator includes a resistance R1, a resistance R2 and an operational amplifier A1.

A first end of the resistance R1 is configured to be connected to a first signal output of the level conversion chip.

A first end of the resistance R2 is connected to a second end of the resistance R1, and a second end of the resistance R2 is configured to be connected to the second preset voltage terminal.

A non-inverting input of the operational amplifier A1 is connected to the second end of the resistance R1, an inverting input of the operational amplifier A1 is connected to the second end of the resistance R2, and an output of the operational amplifier A1 is connected to the control end of the second switch unit.

Optionally, the second switch unit includes a transistor M1.

A gate electrode of the transistor M1 is connected to an output of the comparator, a drain electrode of the transistor M1 is configured to be connected to the first signal output of the level conversion chip, and a source electrode of the transistor M1 is connected to the first end of the energy storage unit.

Optionally, the current control circuit further includes a third switch unit.

A first end of the third switch unit is configured to be connected to the first signal output of the level conversion chip, a second end of the third switch unit is connected to the second end of the energy storage unit, and a control end of the third switch unit is connected to the output of the comparator, so that the comparator controls the third switch unit to be switched-on when a low level signal is received at the first input of the comparator.

Optionally, the third switch unit includes a transistor M2.

A gate electrode of the transistor M2 is connected to an output of the comparator, a source electrode of the transistor M2 is configured to be connected to the first signal output of the level conversion chip, and a drain electrode of the transistor M2 is connected to the second end of the energy storage unit.

Optionally, the current control circuit further includes a Zener diode D1.

An anode of the Zener diode D1 is configured to be connected to the second preset voltage terminal, a voltage of the second preset voltage terminal is lower than a voltage of the first preset voltage terminal, a cathode of the Zener diode D1 is connected to the first end of the first switch unit.

Optionally, the current control circuit further includes a diode D2.

An anode of the diode D2 is configured to be connected to the first signal output of the level conversion chip, and a cathode of the diode D2 is connected to the first end of the energy storage unit.

Optionally, the first switch unit further includes a transistor M3.

A gate electrode of the transistor M3 is connected to an output of the pulse width modulation unit, a drain electrode of the transistor M3 is connected to the first preset voltage terminal, and a source electrode of the transistor M3 is connected to the first end of the energy storage unit.

Optionally, the energy storage unit includes an inductance L1.

A first end of the inductance L1 is configured to be connected to the first signal output of the level conversion chip and the second end of the first switch unit, and a second end of the inductance L1 is configured to be connected to the at least one second signal output of the level conversion chip.

In the second aspect, a display panel driving device is provided, the display panel driving device includes a level conversion chip and the aforesaid current control circuit.

The level conversion chip has a plurality of signal outputs configured to be connected to a plurality of signal inputs of the display panel in a one-to-one correspondence manner: when the level conversion chip receives a power-off instruction, a high level signal is output through a first signal output of a plurality of signal outputs of the level conversion chip.

In the third aspect, a display device is provided, the display device includes a display panel and the display panel driving device according to the second aspect.

The display panel has a plurality of signal inputs, the level conversion chip has a plurality of signal outputs, and the plurality of signal outputs of the level conversion chip are connected to the plurality of signal inputs of the display panel in one-to-one correspondence manner. When the level conversion chip receives a power-off instruction, a high level signal is output through a first signal output of a plurality of signal outputs of the level conversion chip.

In the present application, the current control circuit includes the energy storage unit, the first switch unit, and the pulse width modulation unit. The first end of the energy storage unit is connected to the first preset voltage terminal through the first switch unit, and the first end of the energy storage unit is further connected to the first signal output of the level conversion chip to receive a high level signal. The second end of the energy storage unit is connected to other signal outputs of the level conversion chip. The pulse width modulation unit is configured to modulate a duty cycle of the first switch unit. Thus, when the current control circuit is operated, the pulse width modulation unit can modulate the magnitude of the voltage at the first end of the energy storage unit output by the first preset voltage terminal through the first switch unit by modulating the duty ratio of the first switch unit, thereby accurately controlling the voltage magnitude and the current magnitude of the energy storage unit. Since the second end of the energy storage unit is connected to the at least one second signal output, the second signal output refers to other signal output(s) other than the first signal output in the plurality of signal outputs of the level conversion chip, and the plurality of signal outputs of the level conversion chip are configured to be connected to the plurality of signal inputs of the display panel in a one-to-one correspondence manner. Therefore, the current magnitude of at least one new input of the display panel can be accurately controlled by accurately controlling the current magnitude of the energy storage unit, so that the current magnitude in the display panel can be accurately controlled, and the display panel is protected accordingly.

BRIEF DESCRIPTION OF THE DRAWINGS

In order to describe the embodiments of the present application more clearly, a brief introduction regarding the accompanying drawings that need to be used for describing the embodiments of the present application or exemplary technology is given below: it is obvious that the accompanying drawings described below are merely some embodiments of the present application, a person of ordinary skill in the art may also acquire other drawings according to the current drawings without paying creative labor.

DETAILED DESCRIPTION OF THE EMBODIMENTS

In order to make the purpose, the technical solution and the advantages of the present application be clearer and more understandable, the present application will be further described in detail below with reference to accompanying figures and embodiments. It should be understood that the embodiments described in detail herein are merely intended to illustrate but not to limit the present application.

It should be understood that "a plurality of" mentioned in the present application means two or more than two. In the description of the present application, unless otherwise stated, "/" means alternative. For example, A/B may represent A or B; "and/or" in the context is merely an association relationship for describing associated objects, and indicates that there may be three relationships, for example, A and/or B may indicate that A exists alone, both A and B exist, and B only exists. In addition, in order to clearly describe the technical solutions of the present application, terms such as "first" and "second" are used to distinguish the same item or similar items having substantially the same function and effect. A person skilled in the art may understand that the terms such as "first" and "second" do not limit the quantity and the order of execution. Furthermore, the terms such as "first" and "second" do not indicate that there is a difference between the first and the second.

Figure 1:
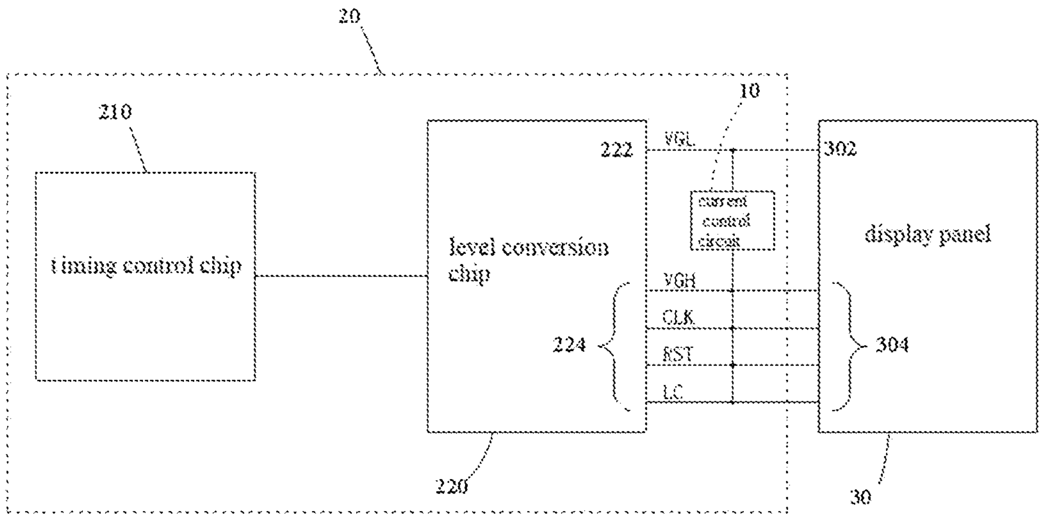
FIG. 1 illustrates a schematic structural diagram of a display device according to the first embodiment of the present application.

FIG. 1 is a schematic structural diagram of a display device according to the present application. As shown in FIG. 1, the display device includes a display panel driving device 20 and a display panel 30. The display panel driving device 20 is configured to drive the display panel 30.

In particular, the display panel driving device 20 includes a timing control chip 210, a level conversion chip 220 and a current control circuit 10. When the timing control circuit 210 is operated, the timing control chip 210 is used to acquire image data of an image to be displayed, and generate a timing control signal according to the image data of the image to be displayed. The level conversion chip 220 is used to obtain the timing control signal output by the timing control chip 210, and generate a plurality of GOA (Gate On Array) signals according to the timing control signal. As shown in FIG. 1, the plurality of GOA signals may include a gate switching-on signal VGH, a gate switching-off signal VGL, a scan signal CLK, a reset signal RST and a polarity conversion signal LC, and the like. The gate-on signal VGH may be a continuous high-level signal, the gate-off signal VGL may be a continuous low-level signal. The scanning signal CLK, the reset signal RST, and the polarity conversion signal LC may be an electric signal which is composed of high-level signals and low-level signals that are alternated and has a certain timing. The level conversion chip 220 has a plurality of signal outputs, and the plurality of signal outputs are configured to output a plurality of GOA signals respectively. In this embodiment of the present application, for the convenience of description, the signal output of the level conversion chip 220 used for outputting the gate switching-off signal VGL is referred to as the first signal output 222: and other signal outputs other than the first signal output 222 in the plurality of signal outputs of the level conversion chip 220 are referred to as the second signal outputs 224.

The display panel 30 has a plurality of signal inputs which include the first signal output 222 and the second signal output 224. The signal outputs (including the first signal output 222 and the second signal output 224) of the level conversion chip 220 are connected to the plurality of signal inputs of the display panel 30 respectively, so that the plurality of GOA signals output from the plurality of signal outputs of the level conversion chip 220 can be input to the plurality of signal inputs of the display panel 30 respectively. The plurality of GOA signals are used to drive the display panel 30, the gate switching-on signal VGH is used to drive the transistor in the display panel 30 to be switched-on, and the gate switching-off signal VGL is used to drive the transistor in the display panel 30 to be switched-off. The scan signal CLK is used to scan the gate electrode of the transistor in the display panel 30. The polarity conversion signal LC is used to control a polarity inversion of a pixel electrode relative to a common electrode in the display panel. In this embodiment of the present application, for the convenience of description, a signal input of the display panel 30 that is connected to the first signal output 222 is referred to as the first signal input 302, and a signal input of the display panel 30 that is connected to the second signal output 224 is referred to as the second signal input 304.

An input of the current control circuit 10 is connected to the first signal output 222, an output of the current control circuit 10 is connected to at least one second signal output 224. That is, the output of the current control circuit 10 is connected to the at least one second signal input 304. When the display device receives the power-off instruction, that is, when the timing control chip 210 and the level conversion chip 220 in the display device receive the power-off instruction, the first signal output 222 of the level conversion chip 220 outputs a high level signal, and each of the second signal outputs 224 of the level conversion chip 220 stops outputting the electric signal. In this condition, the current control circuit 10 is used to control the magnitude of the current of the second signal input 304 connected to the current control circuit 10, thereby controls the magnitude of the current in the display panel 30, so that an objective of protection of the display panel 30 after receiving the power-off instruction is achieved.

It can be understood that, in the embodiment shown in FIG. 1, the current control circuit 10 is located in the display panel driving device 20 and is independent of the level conversion chip 220. In some other embodiments, the current control circuit 10 may also be integrated in the level conversion chip 220.

The current control circuit 10 provided in the present application is illustrated in detail with reference to different embodiments below.

Figure 2:
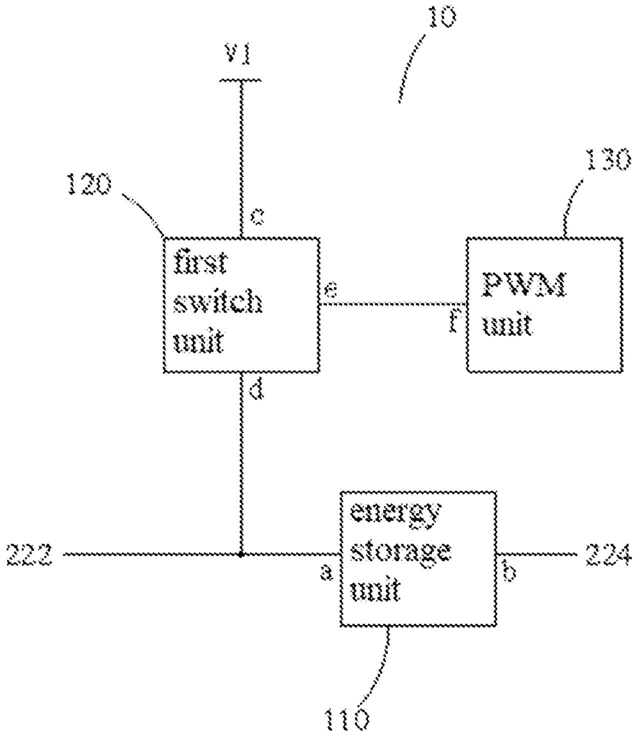
FIG. 2 illustrates a schematic structural diagram of a current control circuit according to the second embodiment of the present application.

FIG. 2 is a schematic structural diagram of a current control circuit 10 according to the present application. As shown in FIG. 2, the current control circuit 10 includes an energy storage unit 110, a first switch unit 120 and a pulse width modulation unit 130.

In particular, the energy storage unit 110 has a first end a and a second end b. The first end a of the energy storage unit 110 is connected to the first signal output 222 of the level conversion chip 220. Thus, when the level conversion chip 220 receives the power-off instruction, the high level signal output by the first signal output 222 is received at the first end a of the energy storage unit 110, the second end b of the energy storage unit 110 is used to be connected to the at least one second signal output 224. That is, the second end b of the energy storage unit 110 is used to be connected to the at least one second signal input 304.

The first switch unit 120 has a first end c, and a second end d and a control end e. The first end c of the first switch unit 120 is used to be connected to the first preset voltage terminal V1. The first preset voltage terminal V1 is used to output a first preset voltage. In some embodiments, the first preset voltage may be 12V. The second end d of the first switch unit 120 is connected to the first end a of the energy storage unit 110. The control end e of the first switch unit

120 is configured to control conductivity or non-conductivity between the first end c and the second end d of the first switch unit 120.

The pulse width modulation unit 130 has an output f. The output f of the pulse width modulation unit 130 is connected to the control end e of the first switch unit 120. The output f of the pulse width modulation unit 130 is used to output a pulse width modulation signal, and the pulse width modulation signal is used to control switching on and off of the first switch unit 120, that is, the pulse width modulation signal is used to control conductivity and non-conductivity between the first end c and the second end d of the first switch unit 120. The pulse width modulation signal may be a pulse signal constituted of high level signals and low level signals alternating with each other. One of the high level signal and the low level signal is used to control the first switch unit 120 to be switched-on, and the other one of the high level signal and the low level signal is used to control the first switch unit 120 to be switched-off. The pulse width modulation signal is used to control the duty cycle of the first switch unit 120, thereby controlling the magnitude of the voltage at the first end a of the energy storage unit 110 and the magnitude of the current in the energy storage unit 110. The duty ratio of the first switch unit 120 refers to a percentage of a switching-on period of the first switch unit 120 to a switching-on and switching-off period of the first switch unit 120, in each switching-on and switching off period of the first switch unit 120. For example, in the first period, the pulse width modulation signal first controls the first switch unit 120 to be continuously switched-on for 0.01 second, and then controls the first switch unit 120 to be continuously switched-off for 0.09 seconds. In the next second period, the pulse width modulation signal still first controls the first switch unit 120 to be continuously switched-on for 0.01 second, and then controls the first switch unit 120 to be continuously switched-off for 0.09 seconds. This circle is repeatedly performed, which means that, the duty cycle of the first switch unit 120 is 10%. When the voltage of the first preset voltage terminal V1 is 12V, if the duty cycle of the first switch unit 120 is 10%, the first preset voltage terminal V1 outputs the voltage of 12V to the first end a of the energy storage unit 110 through the first switch unit 120. When the voltage at the first preset voltage terminal V1 is 12 V, if the duty circle of the first switch unit 120 is 20%, the first preset voltage terminal V1 output a voltage of 12V to the first end a of the energy storage unit 110 through the first switch unit 120. In some specific embodiments, the pulse width modulation unit 130 may be a separately arranged pulse width modulation chip. The pulse width modulation chip is provided with a preset program, so that the pulse width modulation chip can output a fixed pulse width modulation signal. In other specific embodiments, the pulse width modulation unit 130 may also be integrated in the timing control chip 210. The duty cycle of the first switch unit 120 is controlled through the timing control chip 210.

In this embodiment of the present application, the current control circuit 10 includes the energy storage unit 110, the first switch unit 120 and the pulse width modulation unit 130. The first end a of the energy storage unit 110 is connected to the first preset voltage terminal V1 through the first switch unit 120. The first end a of the energy storage unit 110 is further connected to the first signal output 222 of the level conversion chip 220 so as to receive a high level signal. The second end b of the energy storage unit 110 is connected to the second signal output 224 of the level conversion chip 220. The pulse width modulation unit 130 is used to modulate a duty cycle of the first switch unit 120. Thus, when the current control circuit 10 is in operation, the pulse width modulation unit 130 can modulate the magnitude of the voltage at the first end of the energy storage unit 110, which is output by the first preset voltage terminal V1 through the first switch unit 120, by modulating the duty cycle of the first switch unit 120, thereby accurately controlling the voltage magnitude and the current magnitude of the energy storage unit 110. Since the second end b of the energy storage unit 110 is connected to the at least one second signal output 224 of the level conversion chip 220, that is, the second end b of the energy storage unit 110 is connected to at least one second signal input 304 of the display panel 30. Thus, the current magnitude in the display panel 30 can be accurately controlled by accurately controlling the current magnitude of the energy storage unit 110, so that the display panel 30 is protected.

It can be understood that, the level conversion chip 220 in the display panel driving device 20 may have a plurality of second signal outputs 224, and there is no need to connect all of the plurality of second signal outputs 224 to the second end b of the energy storage unit 110. Generally, when at least one second signal output 224 is connected to the second end b of the energy storage unit 110, the magnitude of the current in the display panel 30 may be controlled to a certain extent after the level conversion chip 220 receives the power-off instruction. In some embodiments, when the level conversion chip 220 has the plurality of second signal outputs 224, a second signal output 224 of the level conversion chip 220 with excessive current after the level conversion chip 220 receives the power-off instruction may be detected by using relevant technology, and connect the second signal output 224 with excessive current to the second end b of the energy storage unit 110.

Figure 3:
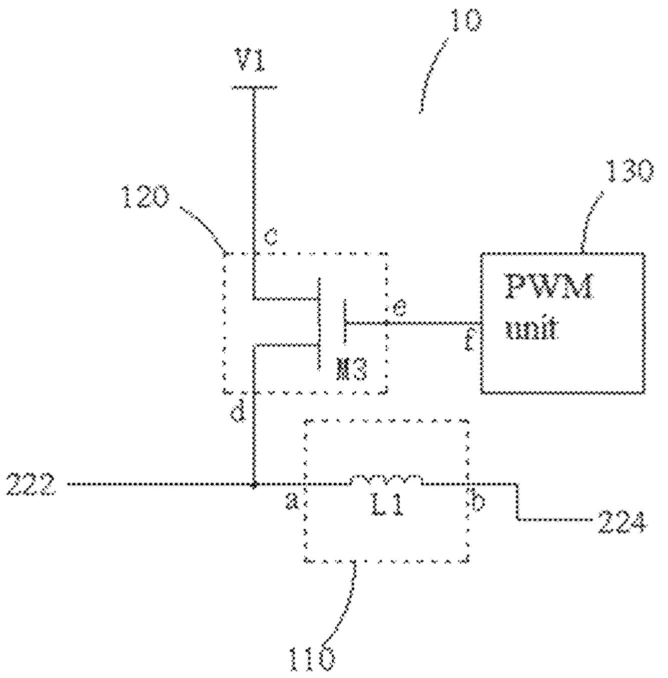
FIG. 3 illustrates a circuit configuration diagram of the current control circuit according to the second embodiment of the present application.

FIG. 3 is a circuit configuration diagram of a current control circuit 10 according to the second embodiment of the present application. As shown in FIG. 3, in some embodiments, the first switching unit 120 includes a transistor M3, the transistor M3 described herein may be a N-type MOS (Metal Oxide Semiconductor) field effect transistor that is switched on at a high level. That is, when the pulse width modulation signal output by the pulse width modulation unit 130 is at a high level, the transistor M3 is switched-on. When the pulse width modulation signal output by the pulse width modulation unit 130 is at a low level, the transistor M3 is switched-off. The gate electrode of the transistor M3 is connected to the output f of the pulse width modulation unit 130, the drain electrode of the transistor M3 is connected to the first preset voltage terminal V1, and the source electrode of the transistor M3 is connected to the first end a of the energy storage unit 110. In some other embodiments, the first switch unit 120 may further include: a resistance connected between the gate electrode of the transistor M3 and the output f of the pulse width modulation unit 130, and/or a resistance connected between the source electrode of the transistor M3 and the first end a of the energy storage unit 110, and/or a resistance connected between the drain electrode of the transistor M3 and the first preset voltage terminal V1.

The energy storage unit 110 may include an inductance L1. A first end of the inductance L1 is connected to a first signal output 222 of the level conversion chip 220, the first end of the inductance L1 is also connected to the second end d of the first switch unit 120. A second end of the inductance L1 is connected to the at least one second signal output 224.

In some other embodiments, the energy storage unit 110 may further include a resistance connected in series with the inductance L1.

Figure 4:
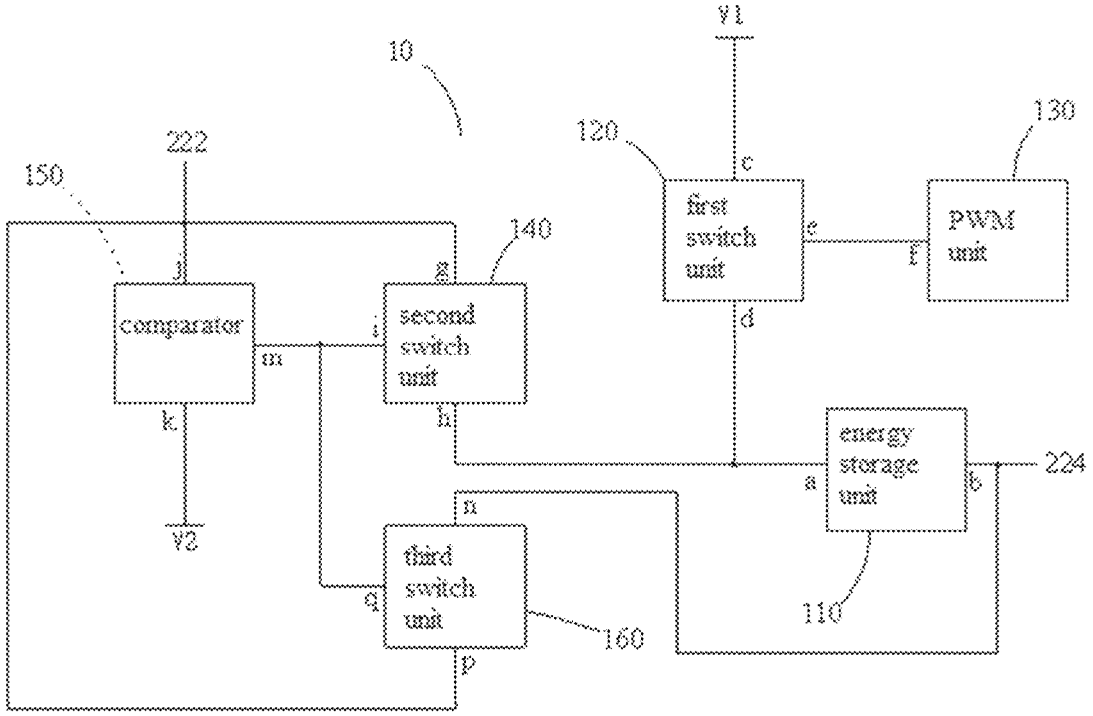
FIG. 4 illustrates a schematic structural diagram of the current control circuit according to the third embodiment of the present application.

FIG. 4 is a schematic circuit configuration diagram of a current control circuit 10 according to the present application. As shown in FIG. 4, on the basis of the second embodiment, the current control circuit 10 may further include a second switch unit 140 and a comparator 150.

In particular, the second switch unit 140 has a first end g, a second end h and a control end i. The first end g of the second switch unit 140 is configured to be connected to the first signal output 222 of the level conversion chip 220, and the second end h of the second switch unit 140 is connected to the first end a of the energy storage unit 110. The control end i of the second switch unit 140 is configured to control conductivity and non-conductivity between the first end g and the second end h of the second switch unit 140. That is, the second switch unit 140 is connected between the first signal output 222 of the level conversion chip 220 and the first end a of the energy storage unit 110. Thus, when the second switch unit 140 is switched-on, that is, the conductivity between the first end g and the second end h of the second switch unit 140 is enabled, the first end a of the energy storage unit 110 is connected to the first signal output 222 of the level conversion chip 220 through the second switch unit 140. When the second switch unit 140 is switched-off, the first end g and the second end h of the second switch unit 140 are disconnected, and the first end a of the energy storage unit 110 and the first signal output 222 of the level conversion chip 220 are also disconnected.

The comparator 150 has a first input j, a second input k and an output m. The first input j is configured to be connected to the first signal output 222 of the level conversion chip 220, the second input k of the comparator 150 is configured to be connected to the second preset voltage terminal V2. The second preset voltage terminal V2 is configured to provide a second preset voltage. The voltage at the second preset voltage terminal V2 is lower than the voltage of the high-level signal, that is, the second preset voltage is lower than the voltage of the high-level signal. The output m of the comparator 150 is connected to the control end i of the second switch unit 140. When a high level signal is received at the first input j of the comparator 150, the comparator 150 controls the second switch unit 140 to be switched-on. At this time, the first end a of the energy storage unit 110 is connected to the first signal output 222 of the level conversion chip 220 through the second switch unit 140. When a low level signal is received at the first input j of the comparator 150, the comparator 150 cannot control the second switch unit 140 to be switched-on; at this time, the second switch unit 140 is switched-off, and the first end a of the energy storage unit 110 is disconnected from the first signal output 222 of the level conversion chip 220. In some embodiments, the second preset voltage terminal V2 may be a ground wire GND. In this condition, the second preset voltage is 0V.

In some embodiments, as shown in FIG. 4, the current control circuit 10 may further include a third switch unit 160. The third switch unit 160 has a first end p, a second end n, and a control end q. The first end p of the third switch unit 160 is configured to be connected to the first signal output 222 of the level conversion chip 220, and the second end n of the third switch unit 160 is connected to the second end b of the energy storage unit 110. The control end q of the third switch unit 160 is configured to control conductivity and non-conductivity between the first end p and the second end n of the third switch unit 160. That is, the third switch unit 160 is connected between the first signal output 222 of the level conversion chip 220 and the second end b of the energy storage unit 110. Thus, when the third switch unit 160 is switched-on, that is, the first end p and the second end n of the third switch unit 160 are conductive, the second end b of the energy storage unit 110 is connected to the first signal output 222 of the level conversion chip 220 through the third switch unit 160. When the third switch unit 160 is switched-off, the first end p is disconnected from the second end n of the third switch unit 160, and the second end b of the energy storage unit 110 is also disconnected from the first signal output 222 of the level conversion chip 220.

The control end q of the third switch unit 160 is connected to the output m of the comparator 150. When a low level signal is received at the first signal input 302 of the comparator 150, the comparator 150 controls the third switch unit 160 to be switched-on. When a high level signal is received at the first signal input 302 of the comparator 150, the comparator 150 controls the third switch unit 160 to be switched-off.

When the level conversion chip 220 receives a power-off instruction, the first signal output 222 of the level conversion chip 220 outputs a high level signal. When the level conversion chip 220 receives a power-on instruction, the first signal output 222 of the level conversion chip 220 may output a low level signal. Generally, the high level signal is in the form of a positive voltage, and the low level signal is in the form of a negative voltage. When the display device is operated normally, the first signal output 222 of the level conversion chip 220 outputs a low level signal. In this embodiment, the current control circuit 10 shown in FIG. 4 may be operated when the level conversion chip 220 receives the power-off instruction and the power-on instruction. When the level conversion chip 220 receives the power-off instruction, the first signal output 222 of the level conversion chip 220 outputs a high level signal. In this condition, the comparator 150 controls the second switch unit 140 to be switched-on, and the high level signal having the positive voltage is output to the first end a of the energy storage unit 110. By modulating the duty cycle of the first switch unit 120 by the pulse width modulation unit 130, the magnitude of the voltage at the first end a of the energy storage unit 110 and the magnitude of the current in the energy storage unit 110 can be modulated, the magnitude of the current in the display panel 30 can be accurately controlled when the display device is powered off, so that the display panel 30 is protected. The first signal output 222 of the level conversion chip 220 outputs a low level signal when the level conversion chip 220 receives the power-on instruction. In this condition, the comparator 150 controls the first switch unit 120 to be switched-on, and the low level signal having the negative voltage is output to the second end b of the energy storage unit 110. The magnitude of the voltage at the first end a of the energy storage unit 110 and the magnitude of the current in the energy storage unit 110 can be modulated by the pulse width modulation unit 130 by modulating the duty cycle of the first switch unit 120, so that the magnitude of the current in the display panel 30 can be accurately controlled when the display device is powered-on, and the display panel 30 is protected.

Figure 5:
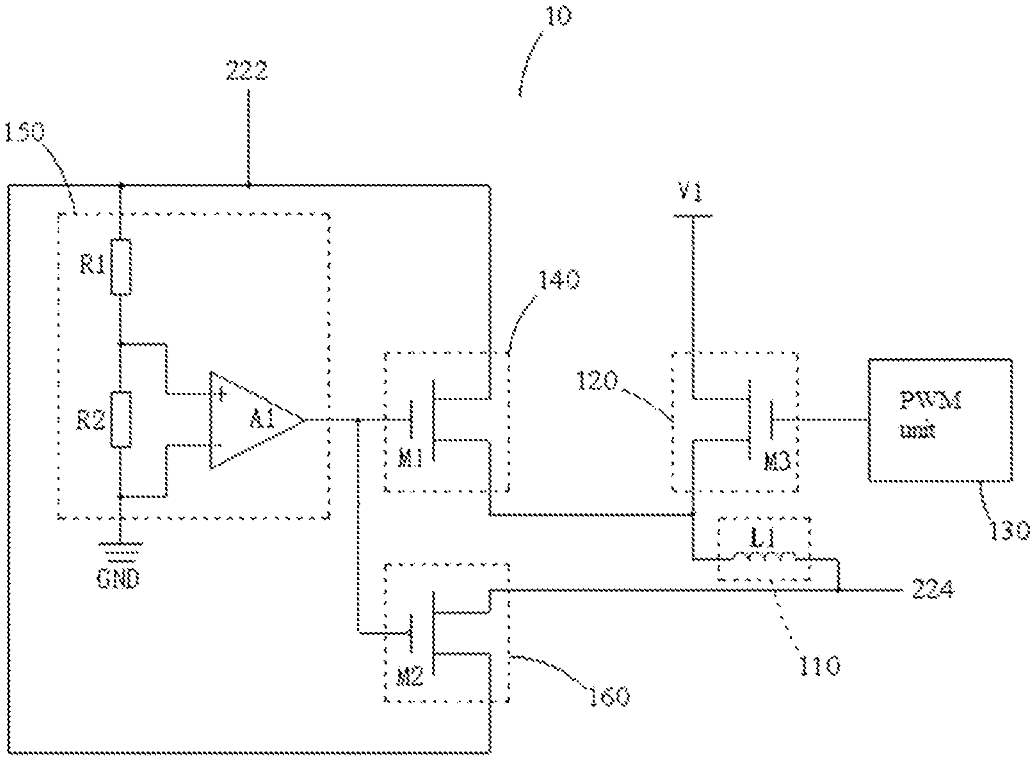
FIG. 5 illustrates a circuit configuration diagram of the current control circuit according to the third embodiment of the present application.

FIG. 5 is a circuit configuration diagram of a current control circuit 10 according to the third embodiment of the present application. As shown in FIG. 5, in some embodiments, the comparator 150 may include a resistance R1, a resistance R2, and an operational amplifier A1.

In particular, a first end of the resistance R1 is configured to be connected to the first signal output 222 of the level conversion chip 220. A first end of the resistance R2 is connected to a second end of the resistance R1, and a second end of the resistance R2 is configured to be connected to a second preset voltage terminal. A non-inverting input of the operational amplifier A1 is connected to the second end of the resistance R1, an inverting input of the operational amplifier A1 is connected to the second end of the resistance R2, and an output of the operational amplifier A1 is connected to a control end of the second switch unit 140. In the embodiment shown in FIG. 5, the second preset voltage terminal V2 is a ground wire GND. The resistance R1 and the resistance R2 may be variable resistances. The operational amplifier A1 may be a zero-crossing voltage comparator. Thus, by modulating the magnitudes of the resistance R1 and the resistance R2, the output of the operational amplifier A1 can be enabled to output a high level signal when the first signal output 222 of the level conversion chip 220 outputs a high level signal: when the first signal output 222 of the level conversion chip 220 outputs a low level signal, the output of the operational amplifier A1 outputs a low level signal.

The second switch unit 140 may include a transistor M1, the transistor M1 described herein may be an N-type MOS transistor that is switched-on at a high level. A gate electrode of the transistor M1 is connected to an output of the comparator 150, a drain electrode of the transistor M1 is configured to be connected to the first signal output 222 of the level conversion chip 220, and a source electrode of the transistor M1 is connected to a first end of the energy storage unit 110. That is, when the first signal output 222 of the level conversion chip 220 outputs a high level signal, the output of the operational amplifier A1 outputs a high level signal, and a conductivity between the source electrode and the drain electrode of the transistor M1 is enabled. When the first signal output 222 of the level conversion chip 220 outputs a low level signal, the output of the operational amplifier A1 outputs a low level signal, and non-conductivity between the source and the drain electrode of the transistor M1 is enabled. In some other embodiments, the second switch unit 140 may further include a resistance connected between the gate electrode of the transistor M1 and the output of the comparator 150, and/or a resistance connected between the source electrode of the transistor M1 and the first end of the energy storage unit 110, and/or a resistance connected between the drain electrode of the transistor M1 and the first signal output 222 of the level conversion chip 220.

The third switching unit 160 may include a transistor M2, the transistor M2 described here may be P-type MOS transistor which is switched-on at a low level. A gate electrode of the transistor M2 is connected to the output of the comparator 150, a source electrode of the transistor M2 is configured to be connected to the first signal output 222 of the level conversion chip 220, and a drain electrode of the transistor M2 is connected to the second end of the energy storage unit 110. That is, when the first signal output 222 of the level conversion chip 220 outputs a low level signal, the output of the operational amplifier A1 outputs a low level signal, and the conductivity between the source electrode and the drain electrode of the transistor M2 is enabled. When the first signal output 222 of the level conversion chip 220 outputs a high level signal, the output of the operational amplifier A1 outputs a high level signal, and a non-conductivity between the source electrode and the drain electrode of the transistor M2 is enabled. In some other embodiments, the third switch unit 160 may further include: a resistance connected between the gate electrode of the transistor M2 and the output of the comparator 150, and/or a resistance connected between the drain electrode of the transistor M2 and the second end of the energy storage unit 110, and/or a resistance connected between the source electrode of the transistor M2 and the first signal output 222 of the level conversion chip 220, etc.

Figure 6:
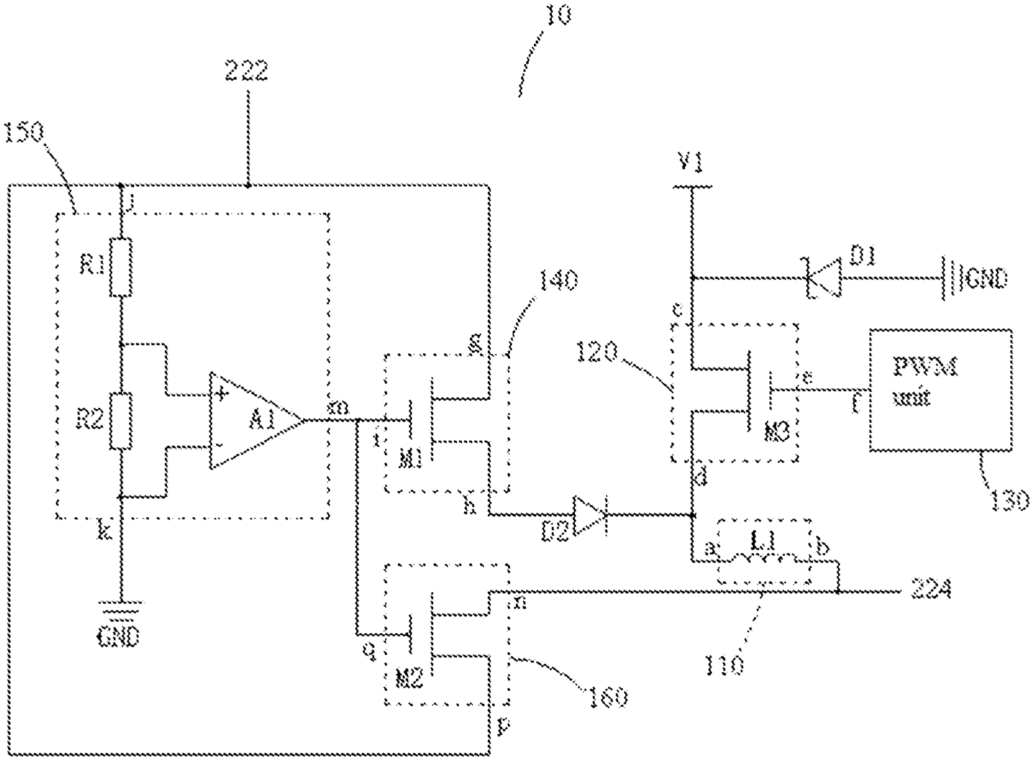
FIG. 6 illustrates a circuit configuration diagram of the current control circuit according to the fourth embodiment of the present application.

FIG. 6 is a circuit configuration diagram of a current control circuit 10 according to the present application. As shown in FIG. 6, the current control circuit 10 further includes a Zener diode D1. An anode of the Zener diode D1 is configured to be connected to a second preset voltage terminal V2, and a voltage at the second preset voltage terminal V2 is lower than a voltage of the first preset voltage terminal. In the embodiment shown in FIG. 6, the second preset voltage terminal V2 is a ground wire GND. A cathode of the Zener diode D1 is connected to a first end c of the first switch unit 120. The Zener diode D1 is connected between the first end c of the first switch unit 120 and the ground wire GND, so that a sudden change of the current which is output from the first preset voltage terminal V1 to the first end c of the first switch unit 120 can be avoided.

The current control circuit 10 may further include a diode D1. An anode of the diode D2 is configured to be connected to the first signal output 222 of the level conversion chip 220, and a cathode of the diode D2 is connected to the first end a of the energy storage unit 110. In the embodiment shown in FIG. 6, the anode of the diode D2 is connected to the first signal output 222 of the level conversion chip 220 through the second switch unit 140. The diode D2 is connected between the first end a of the energy storage unit 110 and the second end h of the second switch unit 140, that is, the diode D2 is connected between the first end a of the energy storage unit 110 and the first signal output 222 of the level conversion chip 220, so that the current in the energy storage unit 110 can be prevented from flowing back to the first signal output 222 of the level conversion chip 220.

The working process of the current control circuit 10 applied to the display device according to the present application will be explained in detail below with reference to FIGS. 1-6.

In the embodiment shown in FIG. 6, transistors M1 and M3 are N-type MOS transistors that are switched on at a high-level and switched off at a low-level. The transistor M2 is a P-type MOS transistor that is switched-on at a low level and switched-off at a high level. The operational amplifier A1 is a zero-crossing voltage comparator. The resistance R1 and the resistance R2 are configured to divide the level signal as output by the first signal output 222 of the level conversion chip 220. The resistance R1 and the resistance R2 are adjustable resistances. By adjusting the resistance values of the resistance R1 and the resistance R2, the operational amplifier A1 is enabled to output a high level signal when the first signal output 222 of the level conversion chip 220 outputs a high level signal. When the first signal output 222 of the level conversion chip 220 outputs a low level signal, the operational amplifier A1 outputs a low level signal.

The current control circuit 10 is connected between the first signal output 222 and the at least one second signal output 224 of the level conversion chip 220 during powering-on or powering-off of the display device. When the display device is operated normally, the current control circuit 10 is disconnected from the first signal output 222 and the at least one second signal output 224. This solution may be implemented by a hardware structure. For example, a switching device is connected between the current control circuit 10 and the first signal output 222 of the level conversion chip 220, and a switching device is connected between the current control circuit 10 and the at least one second signal output 224 of the level conversion chip 220. When the display device receives a power-on instruction or a power-off instruction (that is, both the timing control chip 210 and the level conversion chip 220 receive the power-on instruction or the power-off instruction), the timing control chip 210 controls the two switching devices to be switched-on. When the display device is operated normally, the timing control chip 210 controls the two switching devices to be switched-off.

When the level conversion chip 220 receives the power-off instruction, the first signal output 222 of the level conversion chip 220 outputs a high level signal with a positive voltage. In this condition, the operational amplifier A1 outputs a high level signal, the transistor M2 is switched-off, and the transistor M1 is switched-on. The first signal output 222 of the level conversion chip 220 may output a high level signal to a left end of the inductance L1. Moreover, the first preset voltage terminal V1 also outputs a voltage to the left end of the inductance L1 through the transistor M3, so that the inductance L1 is charged. Thus, the duty cycle of the transistor M3 can be controlled by the pulse width modulation unit 130, and a purpose of accurately controlling the current magnitude of the inductance L1 is achieved.

When the level conversion chip 220 receives the power-on instruction, the first signal output 222 of the level conversion chip 220 outputs a low level signal with a negative voltage. In this condition, the operational amplifier A1 outputs a low level signal, the transistor M1 is switched-off, and the transistor M2 is switched-on. The first signal output 222 of the level conversion chip 220 may output a low level signal to a right end of the inductance L1. Moreover, the first preset voltage terminal V1 also outputs a voltage to the left end of the inductance L1 through the transistor M3, so that the inductance L1 is charged. Thus, the duty cycle of the transistor M3 can be controlled by the pulse width modulation unit 130, and the purpose of accurately controlling the current magnitude of the inductance L1 is achieved.

In this embodiment of the present application, the current control circuit 10 includes the energy storage unit 110, the first switch unit 120 and the pulse width modulation unit 130. A first end a of the energy storage unit 110 is connected to the first preset voltage terminal V1 through the first switch unit 120, the first end a of the energy storage unit 110 is further connected to the first signal output 222 of the level conversion chip 220 so as to receive a high level signal. A second end b of the energy storage unit 110 is connected to the second signal output 224 of the level conversion chip 220. The pulse width modulation unit 130 is configured to modulate a duty cycle of the first switch unit 120. Thus, when the current control circuit 10 is operated, the pulse width modulation unit 130 can modulate the magnitude of the voltage output from the first preset voltage terminal V1 to the first end a of the energy storage unit 110 through the first switch unit 120 by modulating the duty cycle of the first switch unit 120, thereby accurately controlling the voltage magnitude and the current magnitude of the energy storage unit 110. Since the second end b of the energy storage unit 110 is connected to the at least one second signal output 224 of the level conversion chip 220, that is, the second end b of the energy storage unit 110 is connected to at least one second signal input 304 of the display panel 30, the current magnitude in the display panel 30 can be accurately controlled by accurately controlling the current magnitude of the energy storage unit 110, so that the display panel 30 is protected.

The current control circuit 10 may further include a comparator 150, a second switch unit 140, and a third switch unit 160, so that when the first signal output 222 of the level conversion chip 220 outputs a high level signal, the high level signal is output to the first end a of the energy storage unit 110. When the second signal output 224 of the level conversion chip 220 outputs a low level signal, the low level signal is output to the second end b of the energy storage unit 110. The first signal output 222 of the level conversion chip 220 outputs a low level signal when the display device is powered-on. Thus, the pulse width modulation unit 130 can modulate the magnitude of the voltage at the first end of the energy storage unit 110 and the magnitude of the current in the energy storage unit 110 by modulating the duty cycle of the first switch unit 120, thereby accurately controlling the magnitude of the current in the display panel 30 when the display device is powered-up, so that the display panel 30 is protected. The Zener diode D1 is connected between the first end of the first switch unit 120 and the ground wire GND, so that a current sudden change of the current output from the first preset voltage terminal V1 to the first end c of the first switch unit 120 is avoided. The diode D2 is connected between the first end a of the energy storage unit 110 and the first signal output 222 of the level conversion chip 220, so that the current in the energy storage unit 110 can be prevented from flowing back to the first signal output 222 of the level conversion chip 220.

A display panel driving device 20 is further provided in this embodiment of the present application, the display panel driving device 20 includes a level conversion chip 220 and the current control circuit 10 in any one of the embodiments described above.

The level conversion chip 220 has a plurality of signal outputs. The plurality of signal outputs of the level conversion chip 220 are configured to be connected to a plurality of signal inputs of the display panel 30 in a one-to-one correspondence manner. When the level conversion chip 220 receives a power-off instruction, the first signal output 222 of the plurality of signal outputs of the level conversion chip 220 outputs a high level signal.

The current control circuit 10 includes an energy storage unit 110, a first switch unit 120 and a pulse width modulation unit 130. A first end of the energy storage unit 110 is configured to be connected to a first signal output 222 of the level conversion chip 220 so as to receive a high level signal, and a second end of the energy storage unit 110 is configured to be connected to at least one second signal output 224 of the level conversion chip 220. The second signal output 224 is a signal output other than the first signal output 222 in the plurality of signal outputs of the level conversion chip 220. A first end of the first switch unit 120 is configured to be connected to a first preset voltage terminal V1, a second end of the first switch unit 120 is connected to a first end of the energy storage unit 110, and a control end of the first switch unit 120 is connected to an output of the pulse width modulation unit 130. The output of the pulse width modulation unit 130 is configured to output a pulse width modulation signal, and the pulse width modulation signal is used to control the duty cycle of the first switch unit 120, and thereby controlling the magnitude of the voltage at the first end of the energy storage unit 110 and the magnitude of the current in the energy storage unit 110.

In some embodiments, the current control circuit 10 further includes a second switch unit 140 and a comparator 150.

A first end of the second switch unit 140 is configured to be connected to the first signal output 222 of the level conversion chip 220, and the second end of the second switch unit 140 is connected to the first end of the energy storage unit 110.

A first input of the comparator 150 is configured to be connected to the first signal output 222 of the level conversion chip 220, a second input of the comparator 150 is configured to be connected to the second preset voltage terminal V2, the voltage at the second preset voltage terminal V2 is lower than the voltage of the high level signal. An output of the comparator 150 is connected to the control end of the second switch unit 140, so that the second switch unit 140 is controlled to be switched-on when a high level signal is received at the first input of the comparator 150.

In some embodiments, the comparator 150 includes a resistance R1, a resistance R2, and an operational amplifier A1.

A first end of the resistance R1 is configured to be connected to the first signal output 222 of the level conversion chip 220.

A first end of the resistance R2 is connected to a second end of the resistance R1, and a second end of the resistance R2 is configured to be connected to the second preset voltage terminal V2.

A non-inverting input of the operational amplifier A1 is connected to the second end of the resistance R1, an inverting input of the operational amplifier A1 is connected to the second end of the resistance R2, and an output of the operational amplifier A1 is connected to a control end of the second switch unit 140.

In some embodiments, the second switch unit 140 includes a transistor M1.

A gate electrode of the transistor M1 is connected to an output of the comparator 150, a drain electrode of the transistor M1 is configured to be connected to a first signal output 222 of the level conversion chip 220, and a source electrode of the transistor M1 is connected to a first end of the energy storage unit 110.

In some embodiments, the current control circuit 10 further includes a third switch unit 160.

A first end of the third switch unit 160 is configured to be connected to the first signal output 222 of the level conversion chip 220, a second end of the third switch unit 160 is connected to the second end of the energy storage unit 110, and a control end of the third switch unit 160 is connected to the output of the comparator 150, so that the third switch unit 160 is controlled to be switched-on when a low level signal is received at the first input of the comparator 150.

In some embodiments, the third switch unit 160 includes a transistor M2.

A gate electrode of the transistor M2 is connected to the output of the comparator 150, a source electrode of the transistor M2 is configured to be connected to the first signal output 222 of the level conversion chip 220, and a drain electrode of the transistor M2 is connected to the second end of the energy storage unit 110.

In some embodiments, the current control circuit 10 further includes a Zener diode D1.

An anode of the Zener diode D1 is configured to be connected to the second preset voltage terminal V2, a voltage at the second preset voltage terminal V2 is lower than a voltage at the first preset voltage terminal V1, and a cathode of the Zener diode D1 is connected to the first end of the first switch unit 120.

In some embodiments, the current control circuit 10 further includes a diode D2.

An anode of the diode D2 is configured to be connected to the first signal output 222 of the level conversion chip 220, and a cathode of the diode D2 is connected to the first end of the energy storage unit 110.

In this embodiment of the present application, the current control circuit 10 includes the energy storage unit 110, the first switch unit 120 and the pulse width modulation unit 130. A first end of energy storage unit 110 is connected to the first preset voltage terminal through the first switch unit 120. A first end of the energy storage unit 110 is further connected to the first signal output 222 of the level conversion chip 220 so as to receive a high level signal. A second end of the energy storage unit 110 is connected to other signal outputs of the level conversion chip 220. The pulse width modulation unit 130 is configured to modulate a duty cycle of the first switch unit 120. Thus, when the current control circuit 10 is operated, the pulse width modulation unit 130 can modulate the magnitude of the voltage output from the first preset voltage terminal to the first end of the energy storage unit 110 through the first switch unit 120 by modulating the duty cycle of the first switch unit 120, thereby accurately controlling the voltage magnitude and the current magnitude of the energy storage unit 110. Since the second end of the energy storage unit 110 is connected to the at least one second signal output 224 of the level conversion chip 220, that is, the second end of the energy storage unit 110 is connected to the at least one second signal input 304 of the display panel 30, the magnitude of the current in the display panel 30 can be accurately controlled by accurately controlling the magnitude of the current of the energy storage unit 110, so that the display panel 30 is protected.

The current control circuit 10 may further include a comparator 150, a second switch unit 140, and a third switch unit 160, so that when the first signal output 222 of the level conversion chip 220 outputs a high level signal, the high level signal is output to the first end of the energy storage unit 110. When the second signal output 224 of the level conversion chip 220 outputs a low level signal, the low level signal is output to the second end of the energy storage unit 110. When the display device is powered-up, the first signal output 222 of the level conversion chip 220 outputs a low level signal. Thus, the pulse width modulation unit 130 can modulate the magnitude of the voltage at the first end of the energy storage unit 110 and the magnitude of the current in the energy storage unit 110 by modulating the duty cycle of the first switch unit 120, thereby accurately controlling the magnitude of the current in the display panel 30 when the display device is powered-on, and protecting the display panel 30. The Zener diode D1 is connected between the first end of the first switch unit 120 and the ground wire GND, so that the current sudden change of the current output from the first preset voltage terminal V1 to the first end of the first switch unit 120 can be avoided. The diode D2 is connected between the first end of the energy storage unit 110 and the first signal output 222 of the level conversion chip 220, so that the current in the energy storage unit 110 can be prevented from flowing back to the first signal output 222 of the level conversion chip 220.

A display device is further provided in the present application, the display device includes a display panel 30 and a display panel driving device 20 according to any one of the embodiments described above.

The display panel 30 has a plurality of signal inputs. The level conversion chip 220 has a plurality of signal outputs. The plurality of signal outputs of the level conversion chip 220 are configured to be connected to the plurality of signal inputs of the display panel 30 in a one-to-one correspondence manner. When the level conversion chip 220 receives the power-off instruction, the first signal output 222 of the plurality of signal outputs of the level conversion chip 220 outputs a high level signal.

The current control circuit 10 includes an energy storage unit 110, a first switch unit 120 and the pulse width modulation unit 130. A first end of the energy storage unit 110 is configured to be connected to a first signal output 222 of the level conversion chip 220 so as to receive a high level signal, and a second end of the energy storage unit 110 is configured to be connected to at least one second signal output 224 of the level conversion chip 220. The second signal output 224 is a signal output other than the first signal output 222 in the plurality of signal outputs of the level conversion chip 220. A first end of the first switch unit 120 is configured to be connected to a first preset voltage terminal V1, a second end of the first switch unit 120 is connected to a first end of the energy storage unit 110, and a control end of the first switch unit 120 is connected to an output of the pulse width modulation unit 130. The output of the pulse width modulation unit 130 is configured to output a pulse width modulation signal that is used to control the duty cycle of the first switch unit 120 so as to control the magnitude of the voltage at the first end of the energy storage unit 110 and the magnitude of the current in the energy storage unit 110.

In some embodiments, the current control circuit 10 further includes a second switch unit 140 and a comparator 150.

A first end of the second switch unit 140 is configured to be connected to the first signal output 222 of the level conversion chip 220, and a second end of the second switch unit 140 is connected to the first end of the energy storage unit 110.

A first input of the comparator 150 is configured to be connected to the first signal output 222 of the level conversion chip 220, a second input of the comparator 150 is configured to be connected to the second preset voltage terminal, the voltage of the second preset voltage terminal V2 is lower than the voltage of the high level signal V2, and the output of the comparator 150 is connected to the control end of the second switch unit 140, so that when a high level signal is received at the first input of the comparator 150, the second switch unit 140 is controlled to be switched-on.

In some embodiments, the comparator 150 includes a resistance R1, a resistance R2, and an operational amplifier A1.

A first end of the resistance R1 is configured to be connected to the first signal output 222 of the level conversion chip 220.

A first end of the resistance R2 is connected to the second end of the resistance R1, and a second end of the resistance R2 is configured to be connected to a second preset voltage terminal V2.

A non-inverting input of the operational amplifier A1 is connected to the second end of the resistance R1, an inverting input of the operational amplifier A1 is connected to the second end of the resistance R2, and the output of the operational amplifier A1 is connected to the control end of the second switch unit 140.

In some embodiments, the second switch unit 140 includes a transistor M1.

A gate electrode of the transistor M1 is connected to an output of the comparator 150, a drain electrode of the transistor M1 is configured to be connected to the first signal output 222 of the level conversion chip 220, and a source electrode of the transistor M1 is connected to the first end of the energy storage unit 110.

In some embodiments, the current control circuit 10 further includes a third switch unit 160.

A first end of the third switch unit 160 is configured to be connected to the first signal output 222 of the level conversion chip 220, a second end of the third switch unit 160 is connected to the second end of the energy storage unit 110, and a control end of the third switch unit 160 is connected to the output of the comparator 150, so that the third switch unit 160 is controlled to be switched-on when a low level signal is received at the first input of the comparator 150.

In some embodiments, the third switch unit 160 includes a transistor M2.

A gate electrode of the transistor M2 is connected to the output of the comparator 150, a source electrode of the transistor M2 is configured to be connected to the first signal output 222 of the level conversion chip 220, and a drain electrode of the transistor M2 is connected to the second end of the energy storage unit 110.

In some embodiments, the current control circuit 10 further includes a Zener diode D1.

An anode of the Zener diode D1 is configured to be connected to a second preset voltage terminal V2, a voltage of the second preset voltage terminal V2 is lower than a voltage of the first preset voltage terminal, and a cathode of the Zener diode D1 is connected to the first end of the first switch unit 120.

In some embodiments, the current control circuit 10 further includes a diode D2.

An anode of the diode D2 is connected to the first signal output 222 of the level conversion chip 220, and a cathode of the diode D2 is connected to the first end of the energy storage unit 110.

In this embodiment of the present application, the current control circuit 10 includes an energy storage unit 110, the first switch unit 120 and the pulse width modulation unit 130. A first end of the energy storage unit 110 is connected to the first preset voltage terminal V1 through the first switch unit 120, the first end of the energy storage unit 110 is further connected to the first signal output 222 of the level conversion chip 220 so as to receive a high level signal. A second end of the energy storage unit 110 is connected to other signal outputs of the level conversion chip 220. The pulse width modulation unit 130 is configured to modulate a duty cycle of the first switch unit 120. Thus, when the current control circuit 10 is operated, the pulse width modulation unit 130 can modulate the magnitude of the voltage output from the first preset voltage terminal V1 to the first end of the energy storage unit 110 through the first switch unit 120 by modulating the duty cycle of the first switch unit 120, so that the voltage magnitude and the current magnitude of the energy storage unit 110 can be accurately controlled. Since the second end of the energy storage unit 110 is connected to the at least one second signal output 224 of the level conversion chip 220, that is, the second end of the energy storage unit 110 is connected to the at least one second signal input 304 of the display panel 30, the magnitude of the current in the display panel 30 can be accurately controlled by accurately controlling the current magnitude of the energy storage unit 110, so that the display panel 30 is protected.

The current control circuit 10 may further include a comparator 150, a second switch unit 140, and a third switch unit 160, so that when the first signal output 222 of the level conversion chip 220 outputs a high level signal, the high level signal is output to the first end of the energy storage unit 110: when the second signal output 224 of the level conversion chip 220 outputs a low level signal, the low level signal is output to the second end of the energy storage unit 110. When the display device is powered-up, the first signal output 222 of the level conversion chip 220 outputs a low level signal. Thus, by modulating the duty cycle of the first switch unit 120, the pulse width modulation unit 130 can modulate the magnitude of the voltage at the first end of the energy storage unit 110 and the magnitude of the current in the energy storage unit 110, thereby accurately controlling the magnitude of the current in the display panel 30 when the display device is powered on, so that the display panel can be protected. The Zener diode D1 is connected between the first end of the first switch unit 120 and the ground wire GND, such that a current sudden change of the current output from the first preset voltage terminal V1 to the first end of the first switch unit 120 can be avoided. The diode D2 is connected between the first end of the energy storage unit 110 and the first signal output 222 of the level conversion chip 220, so that the current in the energy storage unit 110 can be prevented from flowing back to the first signal output 222 of the level conversion chip 220.

As stated above, the embodiments described above are merely used to illustrate the technical solutions of the present application, rather than limiting the technical solutions of the present application. Although the present application has been described in detail with reference to the embodiments described above, one of ordinary skill in the art should understand that the technical solutions described in these embodiments can still be modified, or some or all technical features in the embodiments can be equivalently replaced. However, these modifications or replacements, which do not make the essences of the corresponding technical solutions to break away from the spirit and the scope of the technical solutions of the embodiments of the present application, should all be included in the protection scope of the present application.

What is claimed is:

1. A current control circuit applied to a display panel driving device, comprising: a level conversion chip, the level conversion chip has a plurality of signal outputs, a plurality of signal outputs of the level conversion chip are configured to be connected to a plurality of signal inputs of the display panel in a one-to-one correspondence manner; a high level signal is output through a first signal output in a plurality of signal outputs of the level conversion chip when the level conversion chip receives a power-off instruction;

wherein the current control circuit comprises an energy storage unit, a first switch unit, and a pulse width modulation unit;

a first end of the energy storage unit is configured to be connected to the first signal output of the level conversion chip to receive the high level signal, a second end of the energy storage unit is configured to be connected to at least one second signal output of the level conversion chip, and the second signal output is other signal output(s) other than the first signal output in a plurality of signal outputs of the level conversion chip;

a first end of the first switch unit is configured to be connected to a first preset voltage terminal, a second end of the first switch unit is connected to a first end of the energy storage unit, and a control end of the first switch unit is connected to an output of the pulse width modulation unit; and an output of the pulse width modulation unit is configured to output a pulse width modulation signal used for controlling a duty cycle of the first switch unit, and thereby controlling a magnitude of a voltage at a first end of the energy storage unit and a magnitude of a current in the energy storage unit.

2. The current control circuit as in claim 1, wherein the current control circuit further comprises a second switch unit and a comparator;

wherein a first end of the second switch unit is configured to be connected to the first signal output of the level conversion chip, a second end of the second switch unit is connected to a first end of the energy storage unit; and a first input of the comparator is configured to be connected to a first signal output of the level conversion chip; a second input of the comparator is configured to be connected to a second preset voltage terminal; a voltage at the second preset voltage terminal is lower than a voltage of the high level signal; an output of the comparator is connected to a control end of the second switch unit, so that the comparator controls the second switch unit to be switched-on when the high level signal is received at the first input of the comparator.

3. The current control circuit as in claim 2, wherein the comparator comprises: a resistance R1, a resistance R2 and an operational amplifier A1;

wherein a first end of the resistance R1 is configured to be connected to a first signal output of the level conversion chip;

a first end of the resistance R2 is connected to a second end of the resistance R1, and a second end of the resistance R2 is configured to be connected to the second preset voltage terminal; and a non-inverting input of the operational amplifier A1 is connected to the second end of the resistance R1, an inverting input of the operational amplifier A1 is connected to the second end of the resistance R2, and an output of the operational amplifier A1 is connected to the control end of the second switch unit.

4. The current control circuit as in claim 2, wherein the second switch unit comprises a transistor M1; and wherein a gate electrode of the transistor M1 is connected to an output of the comparator, a drain electrode of the transistor M1 is configured to be connected to the first signal output of the level conversion chip, and a source electrode of the transistor M1 is connected to the first end of the energy storage unit.

5. The current control circuit as in claim 4, wherein when a high level signal is received at the gate electrode of the transistor M1, a conductivity between the source electrode and the drain electrode of the transistor M1 is enabled.

6. The current control circuit as in claim 2, further comprising a third switch unit; and wherein a first end of the third switch unit is configured to be connected to the first signal output of the level conversion chip, a second end of the third switch unit is connected to the second end of the energy storage unit, and a control end of the third switch unit is connected to the output of the comparator, so that the comparator controls the third switch unit to be switched-on when a low level signal is received at the first input of the comparator.

7. The current control circuit as in claim 6, wherein the third switch unit comprises a transistor M2; and wherein a gate electrode of the transistor M2 is connected to an output of the comparator, a source electrode of the transistor M2 is configured to be connected to the first signal output of the level conversion chip, and a drain electrode of the transistor M2 is connected to the second end of the energy storage unit.

8. The current control circuit as in claim 7, wherein when a low level signal is received at the gate electrode of the transistor M2, a conductivity between the source electrode and the drain electrode of the transistor M2 is enabled.

9. The current control circuit as in claim 2, wherein the second preset voltage terminal is a ground wire.

10. The current control circuit as in claim 1, further comprising: a Zener diode D1;

wherein an anode of the Zener diode D1 is configured to be connected to the second preset voltage terminal, a voltage of the second preset voltage terminal is lower than a voltage of the first preset voltage terminal, and a cathode of the Zener diode D1 is connected to the first end of the first switch unit.

11. The current control circuit as in claim 1, further comprising a diode D2;

wherein an anode of the diode D2 is configured to be connected to the first signal output of the level conversion chip, and a cathode of the diode D2 is connected to the first end of the energy storage unit.

12. The current control circuit as in claim 1, wherein the first switch unit further comprises a transistor M3; and wherein a gate electrode of the transistor M3 is connected to an output of the pulse width modulation unit, a drain electrode of the transistor M3 is connected to the first preset voltage terminal, and a source electrode of the transistor M3 is connected to the first end of the energy storage unit.

13. The current control circuit as in claim 12, wherein when a high level signal is received at the gate electrode of the transistor M3, a conductivity between the source electrode and the drain electrode of the transistor M3 is enabled.

14. The current control circuit as in claim 1, wherein the energy storage unit comprises an inductance L1; and wherein a first end of the inductance L1 is configured to be connected to the first signal output of the level conversion chip and the second end of the first switch unit, and a second end of the inductance L1 is configured to be connected to the at least one second signal output of the level conversion chip.

15. A display panel driving device, comprising: a level conversion chip and a current control circuit;

wherein the current control circuit comprises energy storage unit, a first switch unit, and a pulse width modulation unit;

a first end of the energy storage unit is configured to be connected to a first signal output of the level conversion chip to receive the high level signal, a second end of the energy storage unit is configured to be connected to at least one second signal output of the level conversion chip, and the second signal output is other signal output(s) other than the first signal output in a plurality of signal outputs of the level conversion chip;

a first end of the first switch unit is configured to be connected to a first preset voltage terminal, a second end of the first switch unit is connected to a first end of the energy storage unit, and a control end of the first switch unit is connected to an output of the pulse width modulation unit;

an output of the pulse width modulation unit is configured to output a pulse width modulation signal used for controlling a duty cycle of the first switch unit, and thereby controlling a magnitude of a voltage at a first end of the energy storage unit and a magnitude of a current in the energy storage unit; and wherein the level conversion chip has a plurality of signal outputs configured to be connected to a plurality of signal inputs of the display panel in a one-to-one correspondence manner; when the level conversion chip receives a power-off instruction, a high level signal is output through a first signal output of a plurality of signal outputs of the level conversion chip.

16. A display device, comprising: a display panel and the display panel driving device according to claim 15;

wherein the display panel has a plurality of signal inputs, the level conversion chip has a plurality of signal outputs, and the plurality of signal outputs of the level conversion chip are connected to the plurality of signal inputs of the display panel in one-to-one correspondence manner; when the level conversion chip receives a power-off instruction, a high level signal is output through a first signal output of a plurality of signal outputs of the level conversion chip.

17. The display panel driving device as in claim 15, wherein the current control circuit further comprises a second switch unit and a comparator; and wherein a first end of the second switch unit is configured to be connected to the first signal output of the level conversion chip, and a second end of the second switch unit is connected to a first end of the energy storage unit; and a first input of the comparator is configured to be connected to a first signal output of the level conversion chip; a second input of the comparator is configured to be connected to a second preset voltage terminal; wherein a voltage at the second preset voltage terminal is lower than a voltage of the high level signal; an output of the comparator is connected to a control end of the second switch unit, so that the comparator controls the second switch unit to be switched-on when the high level signal is received at the first input of the comparator.

18. The display panel driving device as in claim 17, wherein the comparator comprises: a resistance R1, a resistance R2 and an operational amplifier A1;

wherein a first end of the resistance R1 is configured to be connected to a first signal output of the level conversion chip;

a first end of the resistance R2 is connected to a second end of the resistance R1, and a second end of the resistance R2 is configured to be connected to the second preset voltage terminal; and a non-inverting input of the operational amplifier A1 is connected to the second end of the resistance R1, an inverting input of the operational amplifier A1 is connected to the second end of the resistance R2, and an output of the operational amplifier A1 is connected to the control end of the second switch unit.

19. The display panel driving device as in claim 17, wherein the second switch unit comprises a transistor M1; and wherein a gate electrode of the transistor M1 is connected to an output of the comparator, a drain electrode of the transistor M1 is configured to be connected to the first signal output of the level conversion chip, and a source electrode of the transistor M1 is connected to the first end of the energy storage unit.

20. The display panel driving device as in claim 17, wherein the current control circuit further comprises a third switch unit;

wherein a first end of the third switch unit is configured to be connected to the first signal output of the level conversion chip, a second end of the third switch unit is connected to the second end of the energy storage unit, and a control end of the third switch unit is connected to the output of the comparator, so that the comparator controls the third switch unit to be switched-on when a low level signal is received at the first input of the comparator.

* * * * *